(12) United States Patent
Kwa et al.

(10) Patent No.: US 8,274,501 B2
(45) Date of Patent: Sep. 25, 2012

(54) TECHNIQUES TO CONTROL SELF REFRESH DISPLAY FUNCTIONALITY

(75) Inventors: Seh W. Kwa, Saratoga, CA (US); Michael Calyer, San Jose, CA (US); Ravi Ranganathan, Sunnyvale, CA (US); Narayan Biswal, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 910 days.

(21) Appl. No.: 12/313,257

(22) Filed: Nov. 18, 2008

(65) Prior Publication Data

US 2010/0123727 A1   May 20, 2010

(51) Int. Cl.
*G06F 3/038* (2006.01)
*G06F 15/16* (2006.01)
*G09G 5/36* (2006.01)
(52) U.S. Cl. .................. 345/211; 345/503; 345/545
(58) Field of Classification Search .............. 345/522, 345/503, 519, 211, 545; 710/310–340
See application file for complete search history.

(56) References Cited

U.S. PATENT DOCUMENTS

| 5,909,225 | A | * | 6/1999 | Schinnerer et al. ........... 345/545 |
| 6,967,659 | B1 | * | 11/2005 | Jayavant et al. .............. 345/506 |
| 7,558,264 | B1 | | 7/2009 | Lolayekar et al. |
| 7,864,695 | B2 | | 1/2011 | Morinaga et al. |
| 2008/0143695 | A1 | | 6/2008 | Juenemann et al. |
| 2008/0168285 | A1 | * | 7/2008 | de Cesare et al. ............ 713/320 |

OTHER PUBLICATIONS

Office Action received for Korean Patent Application No. 10-2009-111387, mailed on Mar. 9, 2011, 4 pages of English Translation and 5 pages of Office Action.
"VESA Embedded DisplayPort Standard", Video Electronics Standards Association (VESA), Version 1.3, Jan. 13, 2011, pp. 1-81.
Section 2.2.5.4 Extension Packet, VESA DisplayPort Standard, Video Electronics Standards Association, Version 1, Revision 1a, Jan. 11, 2008, pp. 1 and 81-83.
Panel Standardization Working Group, "Industry Standard Panels for Monitors—15.0-inch", Mounting and Top Level Interface Requirements, Panel Standardization Working Group, version 1.1, Mar. 12, 2003, pp. 1-19.
Office Action received for Korean Patent Application No. 10-2009-92283, mailed on Feb. 12, 2011, 2 pages of English Translation and 3 pages of Office Action.
Office Action received for Chinese Patent Application No. 200910222296.0, mailed on Sep. 28, 2011, 25 pages of Office action including 8 pages of English Translation.
Office Action Received for Korean Patent Application No. 10-2009-111387 mailed on Jan. 30, 2012, 4 pages of Office Action and 4 pages of English Translation.
Office Action received in Chinese Patent Application No. 200910222296.0, mailed Jun. 20, 2012, 11 pages of Office Action, including 6 pages of English translation.

* cited by examiner

*Primary Examiner* — Hau Nguyen
(74) *Attorney, Agent, or Firm* — Glen B Choi (57) ABSTRACT

Techniques are described to monitor a level of graphics processing activity and control power usage based on the level. When no graphics processing activity is detected for a period of time, then a timing controller for a display device is instructed to capture a current image and repeatedly display the captured image. The graphics processing devices can be powered down. When graphics processing activity is detected, the graphics processing devices are powered up and the components used to capture an image and display the captured image are powered down.

26 Claims, 5 Drawing Sheets

TECHNIQUES TO CONTROL SELF REFRESH DISPLAY FUNCTIONALITY

RELATED APPLICATIONS

This application is related to co-pending U.S. patent application Ser. No. 12/286,192, entitled "Protocol Extensions in a Display Port Compatible Interface," inventors Kwa et al., filed Sep. 29, 2008.

FIELD

The subject matter disclosed herein relates generally to techniques for regulating power consumption.

RELATED ART

Multimedia operations in computer systems are very common. For example, personal computers are often used to process and display video. Power consumption by computers is a concern. It is desirable to regulate power consumption by personal computers.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1A:
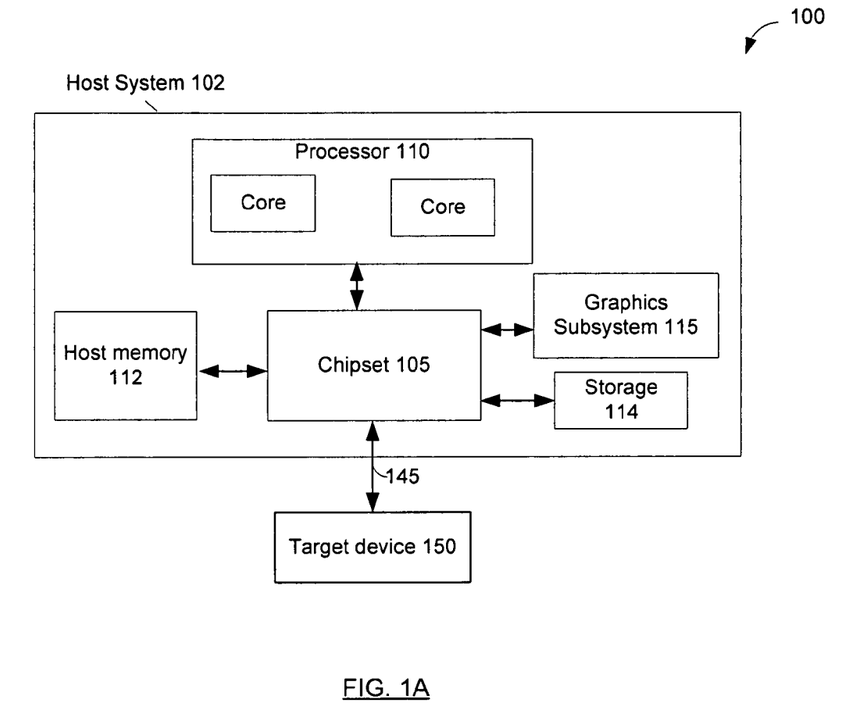
FIG. 1A depicts a system in accordance with an embodiment.

FIG. 1A depicts a system 100 in accordance with an embodiment. System 100 may include a source device such as a host system 102 and a target device 150. Host system 102 may include a processor 110 with multiple cores, host memory 112, storage 114, and graphics subsystem 115. Chipset 105 may communicatively couple devices in host system 102. Graphics subsystem 115 may process video and audio.

In accordance with various embodiments, processor 110 may execute a driver (not depicted) that determines whether to (1) instruct target device 150 to capture an image and repeatedly display the captured image, (2) power down components of graphics subsystem 115, and (3) power down components of target device 150. The driver may determine whether to initiate actions (1), (2), or (3) based at least on: a change in the system timer period, triangle or polygon rendering, any processor core is not in low power mode, any mouse activity, vertical blanking interrupts are used, and overlay is enabled. For example, powering down components may involve reducing voltage regulators to the lowest operating voltage level. For example, when the processor 110 executes a Microsoft Windows compatible operating system, the driver may be a kernel mode driver.

For example, host system 102 may transmit commands to capture an image and power down components to target device 150 using extension packets transmitted using interface 145. Interface 145 may include a Main Link and an AUX channel, both described in Video Electronics Standards Association (VESA) DisplayPort Standard, Version 1, Revision 1a (2008). In various embodiments, host system 102 (e.g., graphics subsystem 115) may form and transmit communications to target device 150 at least in a manner described with respect to co-pending U.S. patent application Ser. No. 12/286,192, entitled "Protocol Extensions in a Display Port Compatible Interface," inventors Kwa et al., filed Sep. 29, 2008.

Target device 150 may be a display device with capabilities to display visual content and broadcast audio content. For example, target device 150 may include control logic such as a timing controller (TCON) that controls writing of pixels as well as a register that directs operation of target device 150.

Figure 1B:
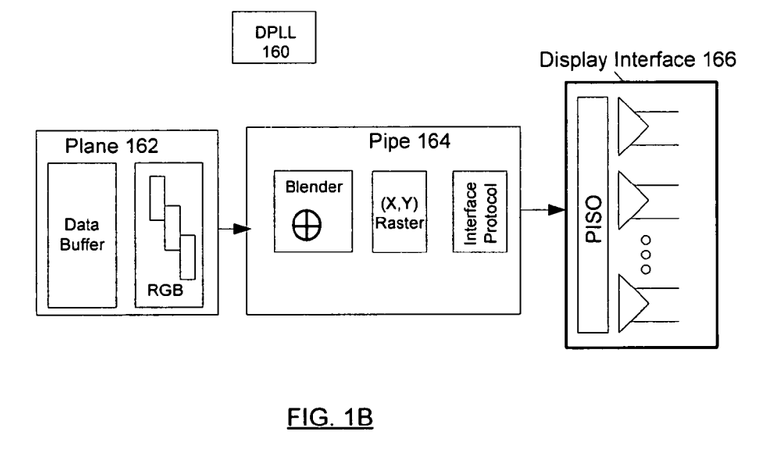
FIG. 1B depicts an example of components of host system whose power consumption can be controlled, in accordance with an embodiment.

FIG. 1B depicts an example of components of host system 102 whose power consumption can be controlled, in accordance with an embodiment. The components can be in chipset, processor, or graphics subsystem. For example, the display phase lock loop (PLL) 160, display plane 162, display pipe 164, and display interface 164 of host 102 can be powered down or up. PLL 160 may be a system clock for the display plane 162, display pipe 164, and display interface 166. For example, display plane 162 may include a data buffer and RGB color mapper, which transforms data from buffer to RGB. Display plane 162 may include an associated memory controller and memory IO (not depicted) that could also be power managed. Pipe 164 may include a blender of multiple layers of images into a composite image, X, Y coordinate rasterizer, and interface protocol packetizer. The interface protocol packetizer may be compliant at least with Display Port or Low-voltage differential signaling (LVDS), available from ANSI/TIA/EIA-644-A (2001). Display interface 166 may include a DisplayPort or LVDS compatible interface and a parallel-in-serial-out (PISO) interface.

Figure 1C:
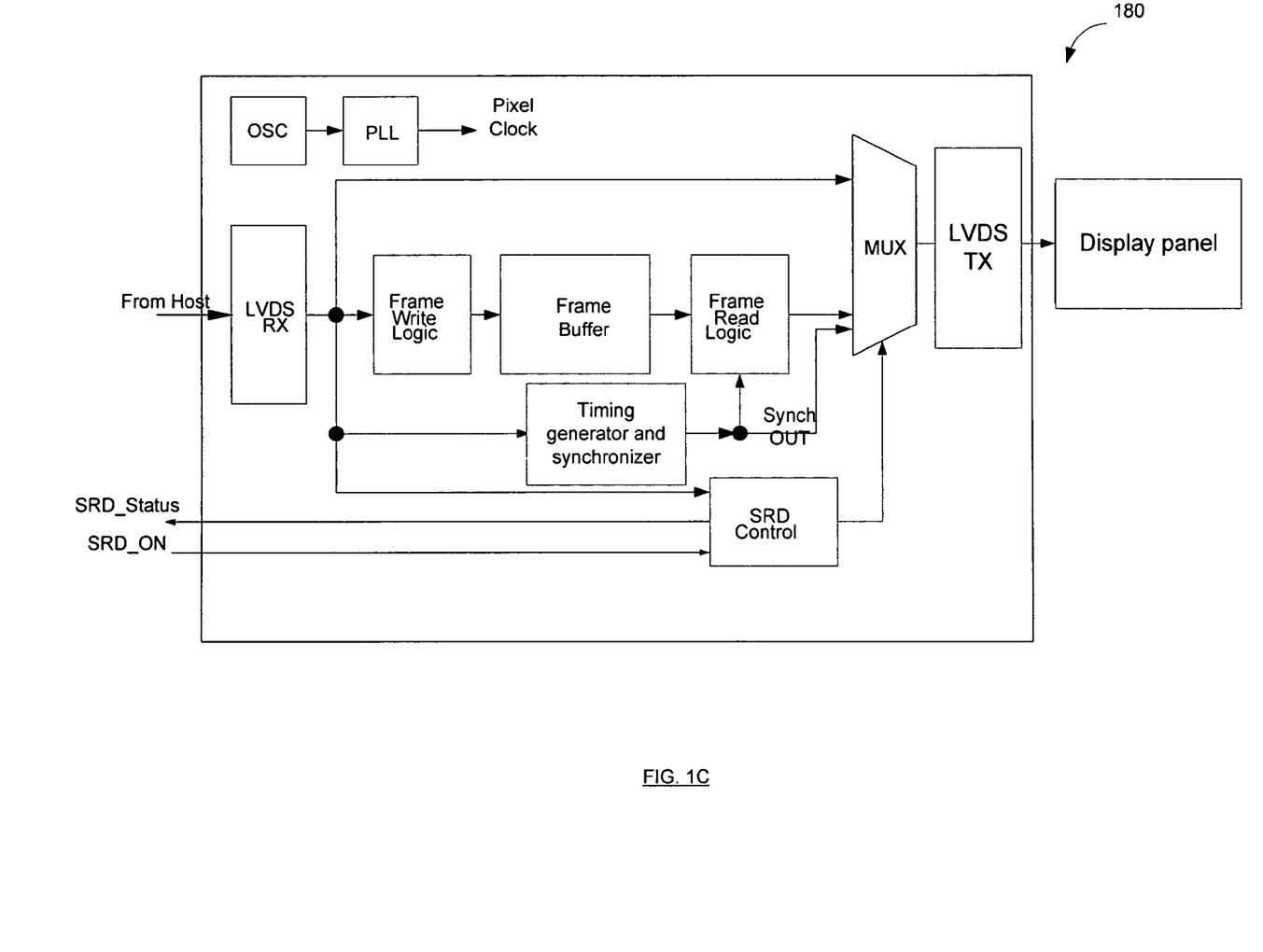
FIG. 1C depicts a high level block diagram of a timing controller for a display device in accordance with an embodiment.

FIG. 1C depicts a high level block diagram of a timing controller for a display device in accordance with an embodiment. Timing controller 180 has the capability to respond to instructions from a host device to enter a self refresh mode that may include powering down components and/or capturing an image and repeatedly outputting the captured image to a display. In response to signal SRD_ON from a host, SRD control block activates the frame buffer to capture a frame and the SRD control block controls the multiplexer (MUX) to transfer the captured frame to the output port. After the frame buffer captures a frame, the SRD control block activates signal SRD_Status to inform the host that the capture has taken place and that the timing controller displays a captured image. After the signal SRD_ON is deactivated, SRD control block deactivates the frame buffer and associated logic and causes the MUX to transfer incoming video from the input port (LVDS RX in this case) to the output port (LVDS TX). Timing controller 180 may use less power because the frame buffer is turned off and the logic clock gated when the self refresh display mode is exited. In various embodiments, SRD_ON and SRD_STATUS can be signals or configured in a register.

Figure 2:
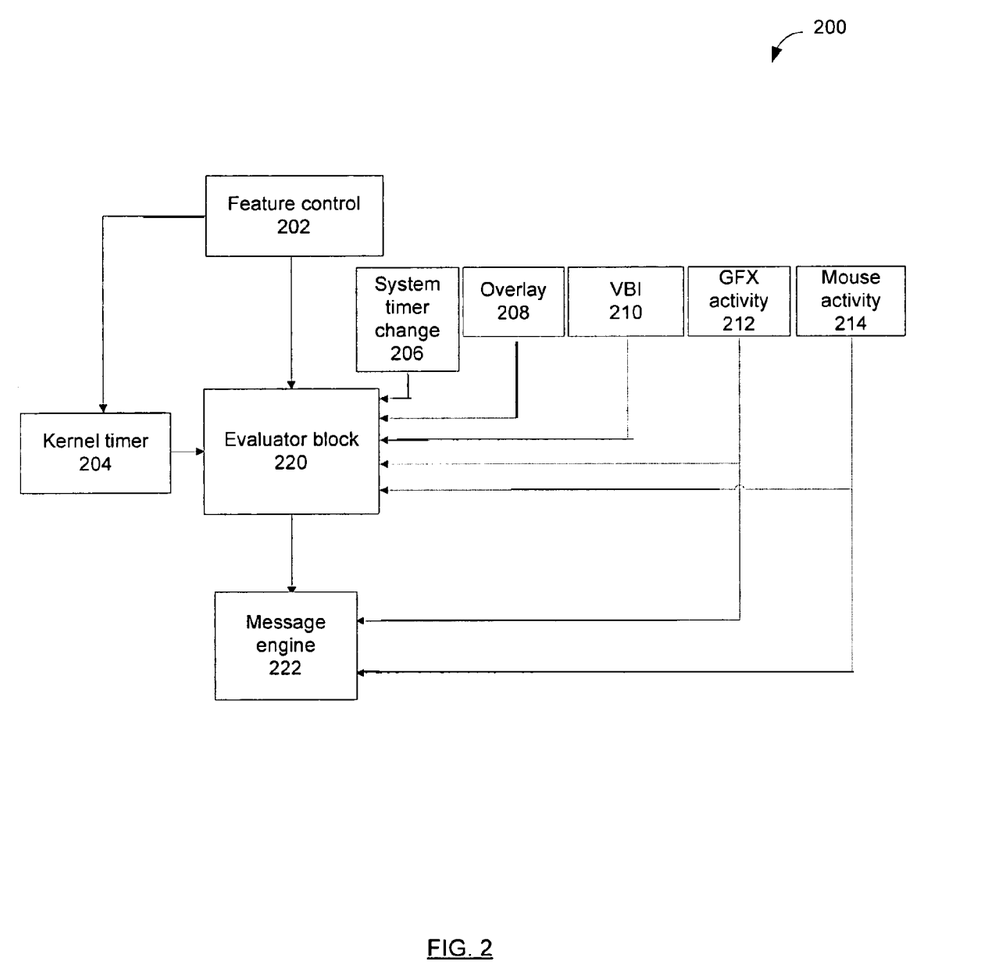
FIG. 2 depicts a block diagram of power management logic in accordance with an embodiment of the present invention.

FIG. 2 depicts a block diagram of power management logic 200 in accordance with an embodiment of the present invention. Power management logic 200 may determine whether to power down components and cause a display device to capture a still image and repeatedly display the captured still image based on inputs of a system timer change, overlay mode, whether vertical blanking interrupts are used, graphics activity, and mouse activity. Power management logic 200 may be a driver executed by a processor.

Feature control block 202 determines whether to disable power management logic 200. Kernel timer block 204 provides a periodic polling timer for monitoring conditions. For example, the polling period can be 10 or 15.6 milliseconds, although other polling periods can be used.

System timer change block 206 indicates whether the system timer period has changed. A number of applications, typically multimedia applications, e.g. Windows Media Player, change the system timer to 1 millisecond when multimedia operations are taking place.

Overlay handling block 208 indicates whether overlay usage of by Microsoft XP is active.

Vertical blank interrupt (VBI) block 210 indicates whether VBIs are used. Applications such as Media Players sometimes make use of APIs that report VBI in order to coordinate media playback for the smoothest possible playback on monitor device. Moreover, the Windows Vista Desktop Composition Engine (DCE) utilizes VBI notification in timing its updates to the display.

Graphics (GFX) activity block 212 indicates whether a graphics engine renders any triangle or polygon.

Mouse activity block 214 indicates whether mouse movement or button use has taken place. Mouse movement or button use indicates a rendering of displayed image is to take place. Mouse activity and graphics activity may be fed into message engine 222 to generate higher priority messages in the event mouse activity and graphics activity activities are detected.

Although not depicted, evaluator block 220 may also consider whether all processor cores of the host are at a low power state. An Intel processor core is a state such as C2 or higher may be considered in a low power state.

If none of the indicators from blocks 206-214 indicate activity for a threshold period of time, then evaluator block 220 may request powering down of a graphics engine, capturing of an image, and the display to repeatedly display a captured image. If any of blocks 206-214 indicates activity, then evaluator block 220 may request powering up of a graphics engine and the display to display input images.

In one embodiment, message engine 222 may transmit instructions from evaluator block 220 using extension packets by writing to a register of the display device. For example, the register can be written using an extension packet of the format described with regard to U.S. patent application Ser. No. 12/286,192, entitled "Protocol Extensions in a Display Port Compatible Interface," inventors Kwa et al., filed Sep. 29, 2008.

Figure 3:
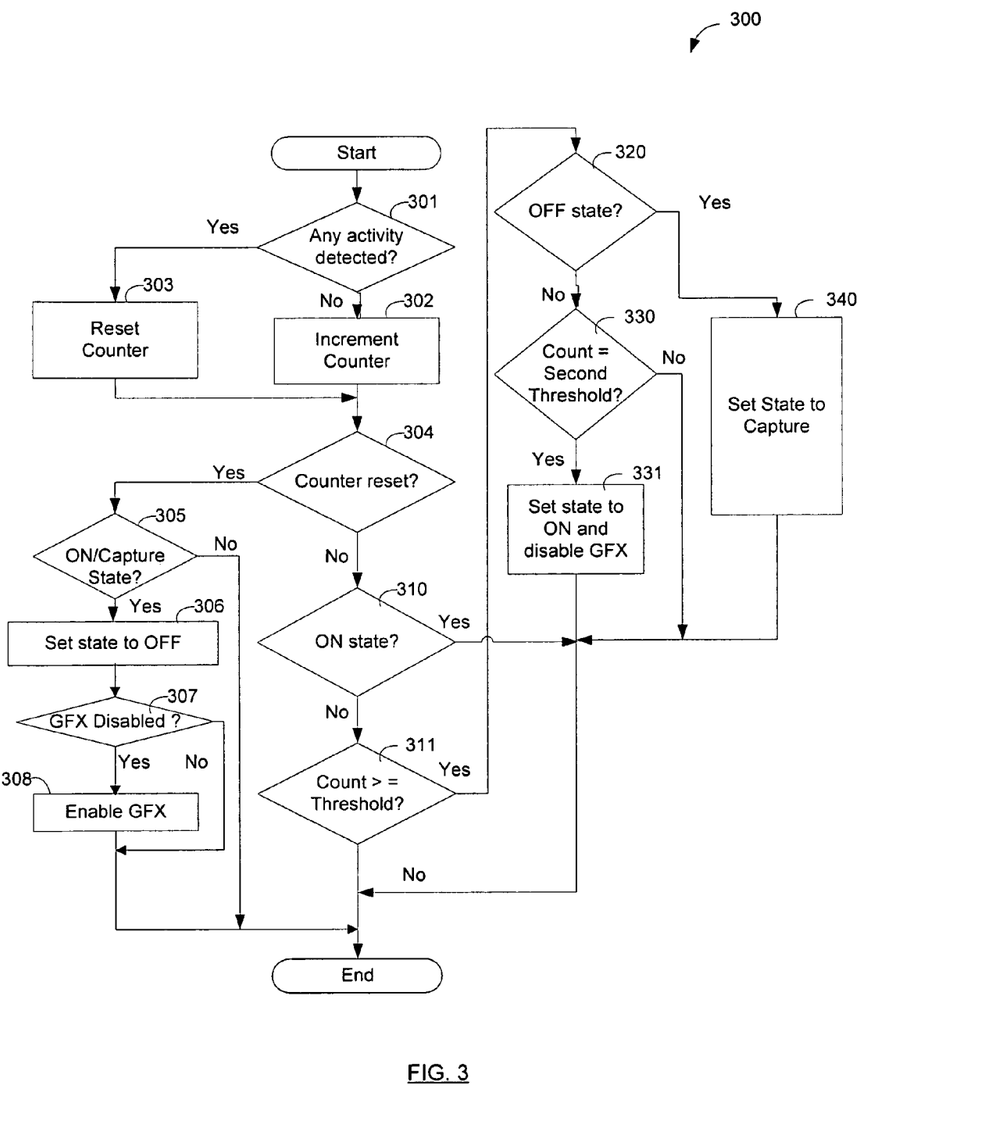
FIG. 3 depicts a flow diagram of a process involved in the detection and decision process of whether to invoke a display self-refresh mode.

FIG. 3 depicts a flow diagram of a process involved in the detection and decision process to power consumption and image display. Block 301 may include determining whether any graphics related activity is detected. A graphics related activity may include any of: overlay handling is used, an operating system currently uses VBI, any graphics processing is taking place, mouse or cursor movement has taken place has taken place, and any processor core is not in a low power state. An Intel processor core in a state such as C2 or higher may be considered in a low power state.

Block 302 may include incrementing a counter if no activity is detected in block 301. Block 303, however, may reset a counter if any activity is detected in block 301. The counter counts a number of system timer periods in which no graphics related activity is detected.

Block 304 may include determining if the counter is reset. If the counter is reset, then block 305 may determine whether the state of the display is ON (e.g., self refresh display mode) or Capture (e.g., capturing an image for display in self refresh display mode). If the state is ON or Capture, then block 306 disables self refresh display mode by setting the state to OFF (e.g., not in self refresh display mode).

If graphics engine (GFX) is determined to be disabled in block 307, then block 308 enables GFX. The components of the graphics engine that are enabled may include those described with regard to FIG. 1B.

If block 304 determines the counter is not reset, block 310 determines whether the state is ON. If the state is not ON, then block 311 follows block 310. If the state is ON, then block 320 follows block 310.

Block 311 may include determining whether the counter meets or exceeds a threshold number. The counter counts a number of system timer periods in which no activity is detected. If the number of system timer periods in which no activity is detected exceeds a threshold, then block 320 may follow block 311. If the number of system timer periods in which no activity is detected does not exceed a threshold, then process 300 may end. Process 300 may restart at the next system timer period following the ending of process 300.

Block 320 may include determining whether the state is OFF. If block 320 determines the state is OFF, then block 340 may set the state to Capture.

If block 320 determines the state of the display is not OFF, then block 330 may determine whether the counter meets a second threshold. The second threshold is a sufficient number of system timer periods have passed so that the frame buffer has had a sufficient period of time to capture an image in response to a prior request to change a state to Capture. If the count is not equal to the second threshold, process 300 ends. If the count equals the second threshold, block 331 sets the state to ON and disables the graphics engine. The components of the graphics engine that are disabled may include those described with regard to FIG. 1B.

Figure 4:
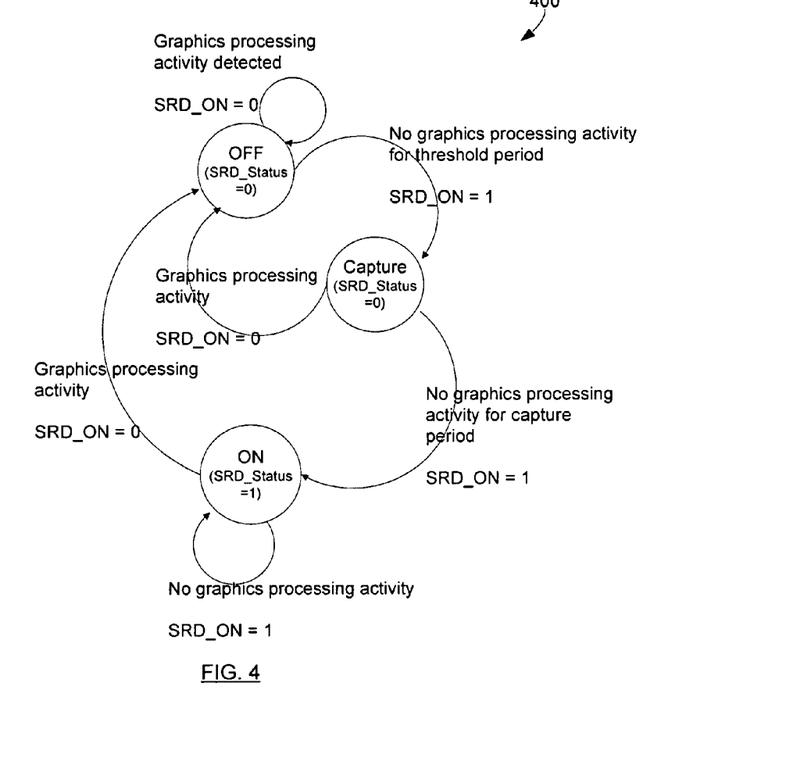
FIG. 4 depicts a state diagram of modes of operation of a display in accordance with an embodiment.

FIG. 4 depicts a state diagram of modes of operation of a display in accordance with an embodiment. In this example, variable SRD_ON may represent an indication of readiness to enter self refresh mode whereas variable SRD_Status may represent that display of the same captured image (i.e., self refresh mode) is on-going.

State OFF refers to a mode in which the graphics processor and display device operate as normal in order to handle graphics processing activity. In state OFF, variables SRD_ON and SRD_Status are set to 0. If none of the following conditions occur for a threshold period of time, then variable SRD_ON is set to 1 but SRD_Status remains at 0 and an image capture state (state Capture) is entered: a change in the system timer period, graphics processor activity (e.g., triangle or polygon rendering), VBI is used, overlay is enabled, any mouse activity, and any processor core is not in low power mode.

State Capture is a state in which a frame buffer of a timing controller captures an image. After a period of time to capture an image, then variable SRD_ON remains at 1 but SRD_Status is set to 1 and state ON is entered.

State ON is a self refresh display mode state in which components are powered off and a captured image displays repeatedly. If any of the above conditions is met, then variables SRD_ON and SRD_Status are set to 0 and state OFF follows state ON. During the transition from state ON to state OFF, the frame buffer of the timing controller is updated with the incoming frame data and the display panel displays the image from the remote frame buffer. State OFF allows pass through of a current frame for display.

The following describes a more detailed operation of the host of FIGS. 1A and 1B and the timing controller of FIG. 1C with regard to variables SRD_ON and SRD_Status. When SRD_ON is set to logical 1, the following activities may take place in timing controller 180 of FIG. 1C: (1) the frame buffer logic and associated clocks and components are activated; (2) the activated frame buffer may capture a full frame; (3) the SRD control logic switches the MUX from bypass mode to repeat mode so that the self refresh logic drives the output port to display panel with a static frame data from the frame buffer; and (4) SRD_Status is set to logical 1 to indicate self refresh mode is on-going.

When SRD_Status is set to logical 1, software turns off the display pipe, display engine, ports, display interface, and PLL of the host (FIGS. 1A and 1B). In addition, the self refresh logic of timing controller 180 (FIG. 1C) drives the output port (e.g., LVDS or DisplayPort) to continuously display a static frame data from the local frame buffer.

For the transition between state ON and OFF, software/driver may cause the host (e.g., CPU or PCH) to set SRD_Status and SRD_ON to 0. In addition, the frame buffer of the timing controller 180 (FIG. 1C) stores every updated frame and the self-refresh logic drives the output port with updated frames from the frame buffer. After timing synchronization is acquired between input and output ports, the timing controller 180 outputs frames received from the receive port (e.g., LVDS RX) and disables the frame buffer and associated clocks and internal timing generator. SRD_Status is then set to 0 to indicate the display of current input video frames.

The following table summarizes the operation of the timing controller for variables SRD_ON and SRD_Status.

| MUX Mode | SRD_ON | SRD_Status | State |
|---|---|---|---|
| Bypass | 0 | 0 | Panel displays the current incoming frame data. |
| Bypass | 1 | 0 | The self refresh logic is acquiring a new full frame. The display panel displaying the current incoming live frame data. |
| Self Refresh Mode | 1 | 1 | The display panel displays a static image from the frame buffer. The incoming display data can be turned OFF. |
| Self Refresh Mode | 0 | 1 | The frame buffer is continuously been updated with the incoming frame data. The display panel displays the image from the frame buffer. |

Figure 5:
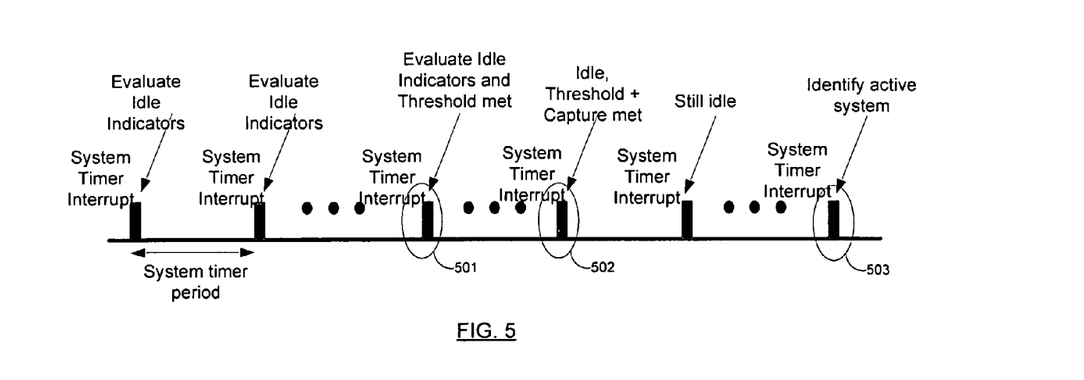
FIG. 5 depicts an example of operations in accordance with an embodiment.

FIG. 5 depicts an example of operations in accordance with an embodiment. Each system timer period, the driver determines whether various components are idle. At 501, the driver determines that a threshold number of system time periods have passed in which the relevant system is in the idle state and the system transitions to the Capture mode. At 502, the driver determines that a period of time for a frame buffer to capture an image has passed and the system enters the ON mode. At 503, the driver identifies that the system is active and causes the system to enter the OFF mode.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   requesting repeated display of a captured image in response to a determination of a first level of graphics processing activity detected for a threshold period of time, the repeated display comprising consecutive display of the image stored one time in a frame buffer, the frame buffer to capture the image;
   permitting display of another received image in response to a determination of a second level of graphics processing activity; and
   causing deactivation of the frame buffer in response to a determination of the second level of graphics processing activity.

2. The method of claim 1, wherein the determination of the first level of graphics processing activity occurs when none of the following is detected: a change in the system timer period, triangle or polygon rendering, any mouse activity, VBI is used, overlay is enabled, and any processor core is not in low power mode.

3. The method of claim 1, wherein the requesting repeated display of a captured image comprises requesting repeated display of the captured image from the frame buffer.

4. The method of claim 1, wherein the determination of a second level of graphics processing activity comprises determination of any of the following activities: a change in the system timer period, triangle or polygon rendering, any mouse activity, VBI is used, overlay is enabled, and any processor core is not in low power mode.

5. The method of claim 1, further comprising:
requesting reduction of power consumption of graphics processing components in response to a determination of the first level of graphics processing for the threshold period of time.

6. The method of claim 5, wherein the graphics processing components comprise any of a phase lock loop, display plane, display pipe, and display interface.

7. The method of claim 6, wherein the display plane comprises a data buffer and a RGB color mapper.

8. The method of claim 6, wherein the display pipe comprises a blender, rasterizer, and interface protocol packetizer.

9. The method of claim 1, wherein requesting repeated display of a captured image comprises using a DisplayPort compatible extension packet to write to a register.

10. An article of manufacture including a machine readable medium having instructions stored thereon, which when executed cause a machine to:
monitor graphics processing activity;
request repeated display of a captured image in response to a determination of a first level of graphics processing activity for a threshold period of time, the repeated display comprises consecutive display of the image stored one time captured in a frame buffer;
permit display of another received image in response to a determination of a second level of graphics processing activity; and
cause deactivation of the frame buffer in response to the determination of the second level of graphics processing activity.

11. The article of manufacture of claim 10, wherein to monitor causes a machine to identify any of the following activities: a change in the system timer period, triangle or polygon rendering, any mouse activity, VBI is used, overlay is enabled, and any processor core is not in low power mode.

12. The article of manufacture of claim 11, wherein the determination of a first level of graphics processing activity comprises not identifying any of the activities.

13. The article of manufacture of claim 10, wherein the determination of a second level of graphics processing activity comprises a determination of any of: a change in the system timer period, triangle or polygon rendering, any mouse activity, VBI is used, overlay is enabled, and any processor core is not in low power mode.

14. The article of manufacture of claim 10, wherein the instructions that cause a machine to request repeated display of a captured image comprise instructions to request use of a DisplayPort compatible extension packet to write to a register.

15. An apparatus comprising:
at least one processor configured to
identify a level of graphics activity;
request capture of an image and repeated display of the captured image in response to detection of a first level of graphics activity over a first period of time, the repeated display comprising consecutive display of the image using a single writing to a frame buffer, the frame buffer to store the image;
request display of another received image in response to detection of a second level of graphics activity; and
cause deactivation of the frame buffer in response to detection of the second level of graphics activity.

16. The apparatus of claim 15, wherein the detection of a first level of graphics activity comprises detection of none of the following activities: a change in the system timer period, triangle or polygon rendering, any mouse activity, VBI is used, overlay is enabled, and any processor core is not in low power mode.

17. The apparatus of claim 15, wherein the detection of a second level of graphics activity comprises detection of any of the following activities: a change in the system timer period, triangle or polygon rendering, any mouse activity, VBI is used, overlay is enabled, and any processor core is not in low power mode.

18. The apparatus of claim 15, wherein display of the captured image comprises display of the captured image from the frame buffer.

19. The apparatus of claim 15, wherein the at least one processor is also configured to:
request deactivation of graphics components in response to detection of the first level of graphics activity over a first period of time.

20. The apparatus of claim 19, wherein the graphics components comprise any of a phase lock loop, data buffer, RGB color mapper, a blender, rasterizer, interface protocol packetizer, and a display interface.

21. The apparatus of claim 15, wherein the request capture of an image and repeated display of the captured image comprises use of a DisplayPort compatible extension packet to write to a register.

22. A system comprising:
a display device; and
a computer system comprising a graphics processor and a processor, wherein the graphics processor is to:
identify a level of graphics activity,
request capture of an image and repeated display of the captured image in response to detection of a first level of graphics activity over a first period of time, the repeated display of the captured image comprises multiple consecutive display of the captured image using a single writing of the captured image to the frame buffer, the frame buffer to store the captured image,
request display of another received image in response to a second level of graphics activity, and
cause deactivation of the frame buffer in response to detection of the second level of graphics activity.

23. The system of claim 22, wherein the detection of a first level of graphics activity comprises detection of none of the following activities: a change in the system timer period, triangle or polygon rendering, any mouse activity, VBI is used, overlay is enabled, and any processor core is not in low power mode.

24. The system of claim 22, wherein the detection of the second level of graphics activity comprises detection of any of the following activities occurring: a change in the system timer period, triangle or polygon rendering, any mouse activity, VBI is used, overlay is enabled, and any processor core is not in low power mode.

25. The system of claim 22, wherein the graphics processor is also to request to deactivate graphics components in response to detection of the first level of graphics activity over the first period of time and wherein the graphics components comprise any of a phase lock loop, data buffer, RGB color mapper, a blender, rasterizer, interface protocol packetizer, and a display interface.

26. The system of claim 22, wherein the request capture of an image and repeated display of the captured image comprises use of a DisplayPort compatible extension packet to write to a register.

* * * * *